United States Patent [19]

Rabinowitz

[11] Patent Number: 4,488,180

[45] Date of Patent: Dec. 11, 1984

[54] VIDEO SWITCHING

[75] Inventor: David B. Rabinowitz, Valley Stream, N.Y.

[73] Assignee: Chyron Corporation, Melville, N.Y.

[21] Appl. No.: 364,901

[22] Filed: Apr. 2, 1982

[51] Int. Cl.³ ............................................. H04N 5/22
[52] U.S. Cl. .................................... 358/183; 358/22; 358/181; 358/185
[58] Field of Search ............... 358/183, 180, 181, 182, 358/22, 185, 335

[56] References Cited

U.S. PATENT DOCUMENTS

| | | | |
|---|---|---|---|
| 3,941,925 | 3/1976 | Busch | 358/183 |
| 4,179,704 | 12/1979 | Moore | 358/185 |
| 4,199,790 | 4/1980 | Greenfield | 358/183 |
| 4,218,711 | 8/1980 | Kashigi | 358/183 |
| 4,266,242 | 5/1981 | McCoy | 358/183 |
| 4,356,511 | 10/1982 | Tsujimura | 358/181 |

Primary Examiner—Tommy P. Chin
Attorney, Agent, or Firm—Hane, Roberts, Spiecens & Cohen

[57] ABSTRACT

A video switching method for switching between two video signal sources for display on a monitor is employed by intensity modulating a video signal on a television raster lines and frames. Digital values representing pixel positions on the field when a switch is to occur from one source to another are stored. The representations of the pixels during the generation of the raster are counted and compared with the stored representations to effect switching when a equality between the two representatives occurs.

6 Claims, 2 Drawing Figures

VIDEO SWITCHING

BACKGROUND OF THE INVENTION

This invention pertains to video switching and, more particularly, to a method of switching between two video signal sources to a video utilization device employing digital techniques.

In present television presentations, there has become a greater demand for special effects. One common special effect is the transition from one thematic sequence to another. At a very rudimentary level, merely when one theme is over, there is an immediate switch to the next theme. However, to enhance the viewability of the program, techniques such as horizontal and vertical wipes are employed, i.e., there is a gradual change across the screen from one scene to another. Heretofore, these techniques utilized a technician-operated joystick to create voltages for controlling the switching. Such techniques limited the types of transitions which could be performed and also relied on the skill of the operator.

SUMMARY OF THE INVENTION

It is a general object of the invention to provide a switching method for transferring between two different video sources which is more versatile and more precise than presently available methods.

Briefly, the invention contemplates a method of switching between two video sources to a video signal utilization device such as a monitor which displays video information by intensity modulating a video signal on a television raster of lines and frames. In particular, there are stored digital values representing pixel positions on the field where a switch is to take place from one video source to another video source. The representations of the pixels are counted and compared with the stored representations. A switching from one source to another is performed when an equality between the representations occurs.

BRIEF DESCRIPTION OF THE DRAWING

Other objects, the features and advantages of the invention will be apparent from the following detailed description when read in conjunction with the accompanying drawing which shows apparatus for performing the method of the invention.

In the Drawing.

DETAILED DESCRIPTION OF THE PREFERRED EMBODIMENTS OF THE INVENTION

Before describing the apparatus for carrying out the invention, it may be useful to review the constitution of a television frame. A television frame is composed of two fields: each field is a plurality of horizontal lines which are interlaced to form a raster. Each horizontal line is made up of a plurality of picture element known as pixels. Thus, any point on the frame of a television picture can be defined as a particular pixel. There can be an absolute pixel value starting from the beginning of the frame or what is more convenient, a pixel value comprising two different numbers. The first number is the horizontal line number and the second number is the pixel in that line. In the context of the present application, when pixel representation is used, it can mean either one of the two above-mentioned definitions.

In general, according to the invention, the pixels whereat switching between the two video sources is to occur is generally stored and compared against a running count of pixels for the frame. With this is mind, there will now be described apparatus for carrying out the invention.

Figure 1:
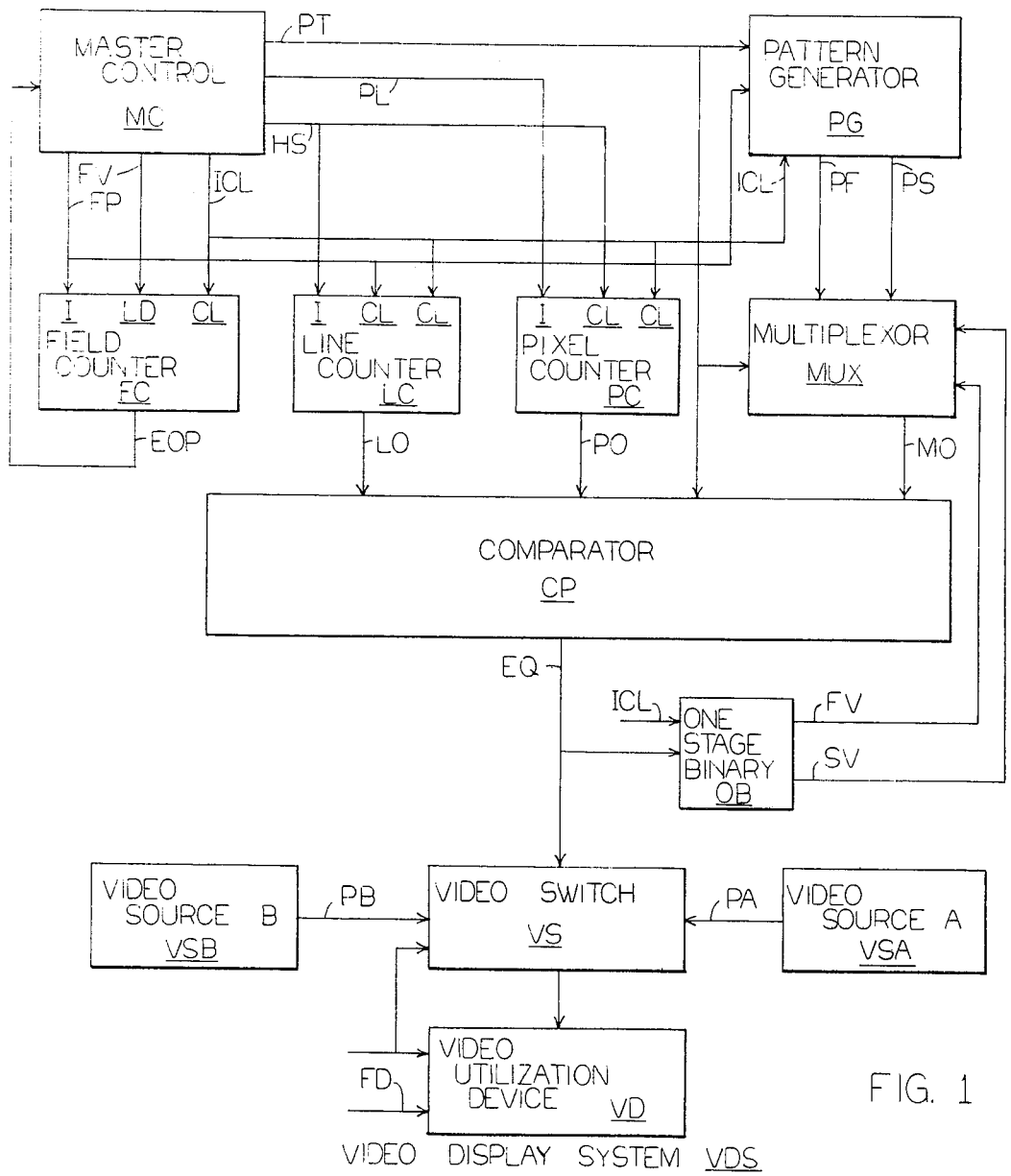
FIG. 1 is a block diagram of a video display system.

In FIG. 1, there is shown a video display system VDS wherein a video switch (which can be of conventional design) controls the transfer of video signals bearing television information from either a video source AVSA over line PA or from video source BVSB over line PB to a video utilization device VD. The video utilization device VD can be, for instance, a television monitor, an amplifier in the television transmitter chain or a video tape recorder. The remainder of the circuitry controls the operation of the video switch VS.

More particularly, the video switch VS is controlled by signals on the line EQ from the comparator CP. The comparator CP compares representations of counts in the line counter LC which is incremented by horizontal sync signals HS and counts in the pixel counter PC which is incremented by pulses on the line PL with representations of pixel transition points on the line MO received from the pattern generator PG via the multiplexor MUX. In addition, there is provided a field counter FC which basically determines when the operation is ended.

The entire operation is under the control of the master control MC. The master control MC includes the basic clock for the system which can be considered the pixel pulses on the line PL. Under normal circumstances, these pixel pulses are counted and when a particular count is reached, a horizontal sync signal is generated on the line HS. Also within the master control MC is a counter which counts the horizontal sync signals and when a particular count is reached will generate a field pulse on the line FP. This field pulse is equivalent to the vertical sync signals in a television raster. Besides generating these clock and incrementing signals, the master control MC generates an initial clear pulse which is fed on the line ICL to clear most of the units. Finally, the master control MC emits signals on the cable PT in accordance with which one of the switching operations is to be performed as is hereinafter more fully described, as well as a field count representation on the cable FV to the load LD input of the field counter FC. This field count representation is an indication of the number of fields required to perform the desired pattern switching. Accordingly, the field counter FC can be a unit down counter which is unit decremented for each field pulse received on the line FP. When the count in the field counter reaches zero, it emits a pulse on the line EOP to tell the master control MC that the operation has been performed.

Figure 2:
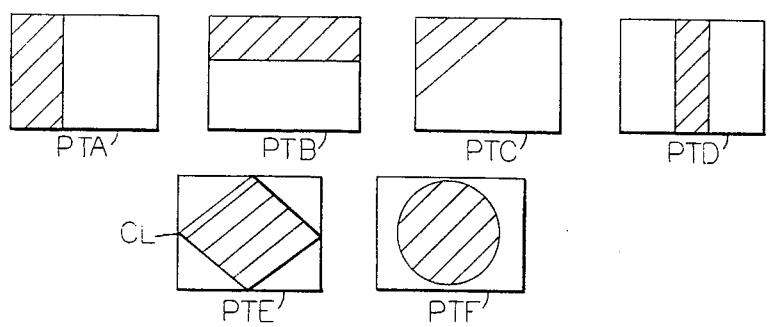
FIG. 2 shows the effects that can occur using the video switching techniques according to the invention.

There will now be described several representative operations. In FIG. 2, there is shown a horizontal wipe transition in pattern PTA. For the sake of definiteness, it will be assumed that the transition is being wiped from left to right. For such an operation, the pattern generator PG can merely be an up counter which is incremented by the pulses on the line FP. The speed at which the wiping takes place is determined by the degree of incrementing. For example, the slowest speed is when the counter is unit incremented for each pulse on the line FP; to obtain wiping which occurs twice as fast, the counter can be designed to increment by two values for each pulse on the line FP, etc.

At the start of the operation, the master control MC emits a pulse on the line ICL which clears the counters of the apparatus to an initial state. Thereafter, the master control sends a count representation to the field counter FC which indicates the number of fields necessary to perform the pattern. At the same time, the master control MC sends over the cable PT an initial minimum value for loading into the counter of the pattern generator PG. Other signals on the cable PT disable the line count circuits of the comparator so that counts will only take place with respect to the pixels along any line. In addition, another signal on the cable PT locks the multiplexor MUX into a state such that the cable PF is connected to the cable MO. The lines of the cable PF are connected to the counter within the pattern generator PG. Thus, the count representation stored in the counter PG is fed into one side of the comparator while at the other side of the comparator there is received on the lines of the cable PO the running representation of the pixel count of each line. Thus, when the pixel count for any line equals the count representation received from the pattern generator PG the comparator EQ feeds a pulse to the video switch VS which now switches, say, from the video source A VSA to the video source B VSB. This kind of switching will occur once per horizontal line. At the end of the horizontal line or the start of the next horizontal line, there is again generated a horizontal sync signal on the line HS. This signal in addition to its other functions will now switch the video switch VS back to its initial position, and the operation continues for the next horizontal line. (It should be noted that the signal on the line HS also clears the pixel counter PC back to an initial value.) AT the end of the field when the field pulse occurs on the line FP, the counter in the pattern generator is incremented to effectively move the wipe another step to the right. It should be noted that for wiping to occur from right to left, it is only necessary to feed a maximum count to the pattern generator PG and make the counter therein a decrementing counter.

The pattern PTB in FIG. 2 shows a vertical wipe. Initially assume that the wipe is from top to bottom. This operation is very similar to that described for a horizontal wipe. In particular, the pattern generator again is a counter which counts field pulses. As before, the counter is loaded with a minimum value from the master control MC on the line PT which this time immobilizes the portion of the comparator associated with counting the pixels in a line so that comparisons will only occur on a line basis. It should be noted to obtain wiping from bottom to top it is only necessary to change the counter in the pattern generator PG to a down counter and to initially load such counter with a maximum value. As with horizontal wiping, the speed at which the wiping occurs can be controlled by controlling the incrementing or decrementing steps.

The pattern PTC of FIG. 2 can be considered as a diagonal wipe from the upper lefthand corner to the lower righthand corner. To perform this operation, the pattern generator PG can be two counters—one of the counters will be associated with the lines and the other with the pixels within the lines. To perform this type of a wipe, both the line and pixel portions of the comparator are operative. However, the multiplexor is still locked up with the lines of cable PF connected to the lines of cable MO. The master control PT feeds minimum value representation to both of the counters in the pattern generator PG. If each of these counters unit increments, then the wipe occurs smoothly across the screen. The speed of the wipe can be controlled again by changing the increment steps of the counters. In addition, the slope of the wipe can also be changed by making each counter increment by a different value. It should be realized also that the diagonal wiping can be controlled to start from any corner to a diagonally opposite corner by controlling whether the counters in the pattern generator are incrementing counters or decrementing counters. For example, if one wishes to go from the lower righthand corner to the upper lefthand corner, both counters are decrementing counters which are initially loaded with maximum values. If one wishes to go from the lower lefthand corner to the upper righthand corner, then the counter storing the pixel value is an incrementing counter which is initially loaded with a minimum value and the counter storing the line representation is a decrementing counter initially loaded with a maximum value.

The pattern PTD can be considered as a spread transition. In this case, the transition starts in the middle of the screen and spreads out horizontally to both horizontal edges. It should be noted that for this type of an operation, there are two transitions or switches in each horizontal line. In performing this operation, the line counting part of the comparator is immobilized; however, the multiplexor MUX is brought into operation. In addition, the pattern generator PG is two counters— one counter is a decrementing counter whose outputs are connected to the line of cable PF and the other counter is an incrementing counter whose outputs are connected to the lines of cable PS. Each counter is loaded initially with the same representation which is the pixel number for the center of a horizontal line. At the start of the operation, the multiplexor MUX connects the lines of cable PF to the lines of cable MO. When the equality is reached, the comparator emits a pulse on the line EQ which operates the video switch. In addition, this pulse switches the one-stage binary counter OP such that the line SV is energized, causing the multiplexor to connect the lines of cable PS to the lines of cable MO, and the comparison of the running count is now with the second value. At equality another EQ pulse is generated to flipe the counter OP and the switch VS. It is also possible to have a compression, i.e., that the transitions start at the sides of the pattern and approach the center. In that case the counter connected to the cable PF would be an incrementing counter while the counter connected to the cable PS would be a decrementing counter. The incrementing counter would initially be loaded with a minimum value and the decrementing counter with a maximum value.

In an analogous way, it should be apparent that one can have a vertical spread or vertical compression merely utilizing line counts and not pixel counts.

The pattern PTE of FIG. 2 can be considered as an expanding diamond which starts at the very center of the screen and goes toward the edges. In this case, it will be necessary for the pattern generator to comprise four counters considered as two pairs of two counters. The one pair of counters is connected to the cable PF and the second pair to the cable PS. This time, however, one of the counters of a pair will store a line representation and the other a pixel representation. As with the generation of the wipe shown in pattern PTC incrementing of the counters of the pairs is performed to provide the "diagonal" nature of the wipe. One further modification is necessary and that is that there must be a count of the field pulses at least to the point where the center line CL is reached and at that point the counters in the pattern generator change from incrementing to decrementing and vice versa.

The pattern PTF of FIG. 2 represents an expanding dot; however, it should be realized that it could represent almost any conceivable contour. To be able to perform this type of manipulation, it is necessary that the pattern generator PG be a read-only memory wherein each address of the ROM contains the two transition points in a horizontal line. Thus, for each of the field pulses FP, the ROM is incremented to the next address and its contents made available to the lines of cables PF and PS as in the above-described operation.

While the present invention has been shown utilizing discrete counters and the like, it should be realized that the same operations can be performed utilizing a suitably programmed microprocessor.

While only a limited number of embodiments have been shown and described in detail, there will now be obvious to those skilled in the art many modifications and variations satisfying many or all of the objects of the invention without departing from the spirit thereof as defined by the appended claims.

What is claimed is:

1. Method of switching between two video sources to a video signal utilization device which displays video information by intensity modulating generated video signal on a television raster of lines and frames forming fields comprising storing digital values representing pixel positions on the field when a switch is to occur from one video source to another, counting representations of pixels during the generation of the raster, comparing the counted representations with the stored representations, and switching from said one video source to said other when an equality of said representation exists.

2. The method of claim 1 wherein the pixel representations are associated with a whole raster line and the raster line changes in synchronism with the generation of the rasters.

3. The method of claim 1 wherein the pixel representation is for one particular pixel of a raster line and the particular pixel on the line changes in synchronism with the generation of the raster.

4. The method of claim 1 wherein there are two pixel representations on a raster line, at wherein there is a comparison for each representation resulting in a switch from the first video source to the second video source for a first comparison and thereafter from the second video source to the first video source for a second comparison.

5. The method of claim 4 wherein the representations change in synchronism with the generation of the rasters.

6. The method of claim 1 wherein the pixel representations are associated with two entire raster lines, the two raster lines changing in synchronism with the generation of the raster.

* * * * *